US010096808B2

(12) United States Patent
Kim

(10) Patent No.: US 10,096,808 B2
(45) Date of Patent: Oct. 9, 2018

(54) SECONDARY BATTERY

(71) Applicant: Samsung SDI Co., Ltd., Yongin-si, Gyeonggi-do (KR)

(72) Inventor: Dae-Kyu Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 992 days.

(21) Appl. No.: 13/842,309

(22) Filed: Mar. 15, 2013

(65) Prior Publication Data

US 2014/0199567 A1     Jul. 17, 2014

(30) Foreign Application Priority Data

Jan. 11, 2013    (KR) .................. 10-2013-0003495

(51) Int. Cl.
     *H01M 2/12*         (2006.01)

(52) U.S. Cl.
     CPC .... *H01M 2/1241* (2013.01); *H01M 2200/106* (2013.01)

(58) Field of Classification Search
     CPC ..... H01M 2/12; H01M 2/1241; H01M 2/1235
     USPC .......................................................... 429/82
     See application file for complete search history.

(56) References Cited

U.S. PATENT DOCUMENTS

| | | | |
|---|---|---|---|
| 2008/0171260 A1* | 7/2008 | Kim | H01M 2/1294 429/82 |
| 2009/0117459 A1* | 5/2009 | Hyung et al. | 429/185 |
| 2010/0136388 A1* | 6/2010 | Kim | H01M 2/1241 429/56 |
| 2010/0215997 A1* | 8/2010 | Byun | H01M 2/0413 429/61 |
| 2011/0117398 A1* | 5/2011 | Kang | 429/56 |
| 2011/0200854 A1 | 8/2011 | Bak et al. | |
| 2011/0212350 A1* | 9/2011 | Sato et al. | 429/56 |
| 2012/0040213 A1* | 2/2012 | Byun | H01M 2/0456 429/56 |
| 2012/0177961 A1* | 7/2012 | Lee | H01M 2/0285 429/82 |

FOREIGN PATENT DOCUMENTS

| | | |
|---|---|---|
| KR | 10-1999-0084019 A | 12/1999 |
| KR | 10-2011-0095118 A | 8/2011 |

* cited by examiner

*Primary Examiner* — Jonathan G Jelsma
*Assistant Examiner* — Rashid A Alam
(74) *Attorney, Agent, or Firm* — Knobbe Martens Olson & Bear LLP

(57) ABSTRACT

A secondary battery is disclosed. In one aspect, the battery includes an electrode assembly, a can accommodating the electrode assembly therein and a cap assembly sealing the can. The cap assembly includes a sub-plate electrically connected to the electrode assembly and a vent having a protruding portion electrically connected to the sub-plate. The vent includes i) a first fracture portion and ii) a second fracture portion formed between the first fracture portion and the protruding portion.

24 Claims, 5 Drawing Sheets

SECONDARY BATTERY

RELATED APPLICATIONS

This application claims priority to and the benefit of Korean Patent Application No. 10-2013-0003495, filed on Jan. 11, 2013, in the Korean Intellectual Property Office, the entire content of which is incorporated herein by reference.

BACKGROUND

1. Field

The described technology generally relates to a secondary battery, and more particularly, to a secondary battery having improved safety.

2. Description of the Related Technology

Secondary batteries are rechargeable batteries, unlike primary batteries. A small-capacity secondary battery is used in a small-sized portable electronic device such as a cellular phone, notebook computer or camcorder, and a large-capacity secondary battery is used as a power source for driving a hybrid vehicle or a large-capacity power storage device.

A high-power secondary battery using a non-aqueous electrolyte with high energy density has recently been developed. The high-power secondary battery is configured as a large-capacity battery module manufactured by connecting a plurality of secondary batteries in series so as to be used for driving devices, e.g., motors of electric vehicles and the like, which require high power.

SUMMARY

One inventive aspect is a secondary battery capable of improving safety by quickly exhausting gas generated inside the secondary battery to the environment.

Another aspect is a secondary battery having an additional gas vent.

Another aspect is a secondary battery, including: an electrode assembly; a can accommodating the electrode assembly therein; and a cap assembly sealing the can, wherein the cap assembly includes a sub-plate electrically connected to the electrode assembly, and a protruding portion electrically connected to the sub-plate, and wherein the vent includes a first fracture portion and a second fracture portion formed on a partial region between the first fracture portion and the protruding portion.

The first fracture portion may be fractured when the internal pressure of the secondary battery exceeds a first fracture pressure, and the second fracture may be fractured when the internal pressure of the secondary battery exceeds a second fracture pressure. The first and second fracture pressures may be different from each other.

The first fracture pressure may be higher than the second fracture pressure.

The thickness of the second fracture portion may be smaller than that of the first fracture portion.

The first fracture portion may be notched in a circular shape along the circumference of the protruding portion.

The first fracture portion may include a disconnection region on which a certain region is not notched.

The second fracture portion may be notched in a cross (+) shape.

The second fracture portion may include a fracture region having a thickness identical to that of the first fracture portion or smaller than that of the first fracture portion, and a fracture line may be formed at a portion of the fracture region.

The fracture line may be formed in plural numbers, and the plurality of fracture lines may cross each other.

The fracture region may have a circular or quadrangular shape.

The cap assembly may further include a cap-up and a cap-down, and the vent may be positioned between the cap-up and the cap-down.

The vent may include a body portion at which the protruding portion and the first and second fracture portions are formed; a flange portion extended from the body portion; and a connection portion formed between the flange portion and the body portion.

The thickness of the body portion may be formed to be 0.29 to 0.31 mm, and the thicknesses of the first and second fracture portions may be 0.09 to 0.11 mm and 0.07 to 0.089 mm, respectively.

The first fracture pressure may be 19 to 21 $kgf/cm^2$, and the second fracture pressure may be 14 to 16 $kgf/cm^2$.

Another aspect is a secondary battery, comprising: an electrode assembly; a can accommodating the electrode assembly therein; and a cap assembly sealing the can, wherein the cap assembly comprises a sub-plate electrically connected to the electrode assembly and a vent having a protruding portion electrically connected to the sub-plate, and wherein the vent comprises i) a first fracture portion and ii) a second fracture portion formed between the first fracture portion and the protruding portion.

In the above battery, the first fracture portion is configured to be fractured when an internal pressure of the secondary battery becomes greater than a first fracture pressure, wherein the second fracture portion is configured to be fractured when the internal pressure becomes greater than a second fracture pressure different from the first fracture pressure.

In the above battery, the first fracture pressure is greater than the second fracture pressure. In the above battery, the second fracture portion is thinner than the first fracture portion. In the above battery, the first fracture portion is notched in a substantially circular shape along the circumference of the protruding portion. In the above battery, the first fracture portion includes a disconnection region on which a certain region is not notched. In the above battery, the second fracture portion is notched in a cross (+) shape.

In the above battery, the second fracture portion includes a fracture region having a thickness substantially identical to that of the first fracture portion or smaller than that of the first fracture portion, and wherein a fracture line is formed at a portion of the fracture region. In the above battery, the fracture line is formed in plural numbers, and wherein the fracture lines cross each other.

In the above battery, the fracture region has a substantially circular shape or a substantially quadrangular shape. In the above battery, the cap assembly further comprises a cap-up and a cap-down, and wherein the vent is positioned between the cap-up and the cap-down. In the above battery, the vent comprises: a body portion on which the protruding portion and the first and second fracture portions are formed; a flange portion extending from the body portion; and a connection portion formed between the flange portion and the body portion.

In the above battery, the thickness of the body portion is in the range of about 0.29 mm to about 0.31 mm, and wherein the thicknesses of the first and second fracture portions are in the ranges of about 0.09 mm to about 0.11 mm and about 0.07 mm to about 0.089 mm, respectively. In the above battery, the first fracture pressure is in the range of about 19 kgf/cm² to about 21 kgf/cm², and wherein the second fracture pressure is in the range of about 14 kgf/cm² to about 16 kgf/cm². In the above battery, the first fracture portion is different in size and shape from the second fracture portion.

Another aspect is a secondary battery, comprising: an electrode assembly; a can accommodating the electrode assembly therein; and a cap assembly closing the can, wherein the cap assembly comprises a gas vent, and wherein the gas vent comprises at least two fracture regions configured to be fractured by a fracture pressure applied thereto.

In the above battery, the fracture regions are configured to be fractured by different fracture pressures. In the above battery, the fracture regions comprise a first fracture region notched in a substantially circular shape and a second fracture region notched in a cross (+) shape.

Another aspect is a secondary battery, comprising: an electrode assembly; a can accommodating the electrode assembly therein; and a cap assembly closing the can, wherein the cap assembly comprises i) a first fracture region configured to be fractured when an internal pressure of the secondary battery becomes greater than a first fracture pressure and ii) a second fracture region configured to be fractured when the internal pressure becomes greater than a second fracture pressure different from the first fracture pressure.

In the above battery, the cap assembly comprises a gas vent located between a positive temperature coefficient (PTC) thermistor and the electrode assembly, and wherein the first and second fracture regions are formed in the gas vent.

DETAILED DESCRIPTION

Figure 1A:
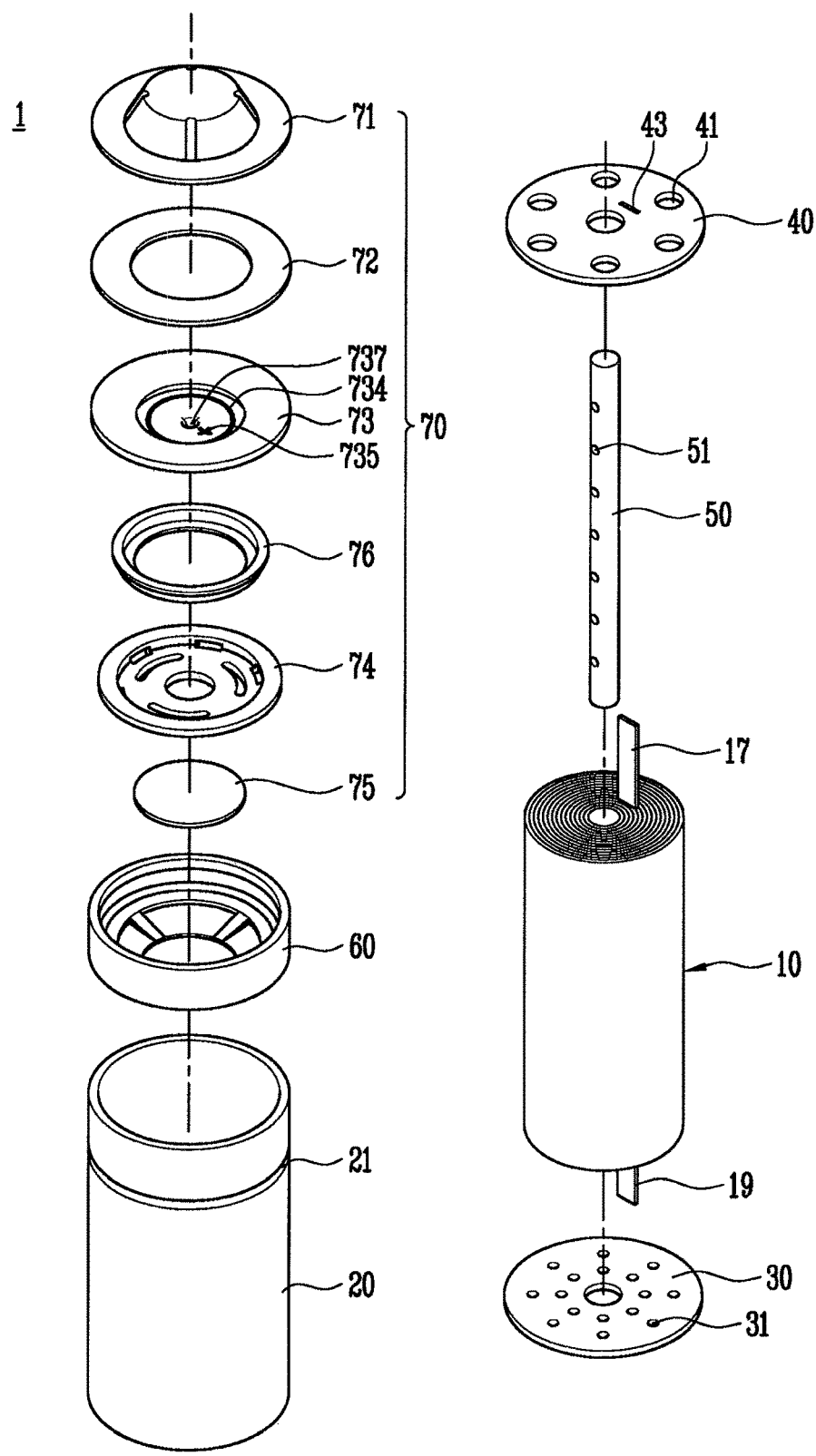
FIG. 1A is an exploded perspective view of a secondary battery according to some embodiments.

While a secondary battery is repeatedly charged and discharged, gas is generated inside the secondary battery, and therefore, the internal pressure of the secondary battery increases. If the increase in the internal pressure of the secondary battery remains for a certain period of time, the secondary battery may explode.

In the following detailed description, only certain embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 1B:
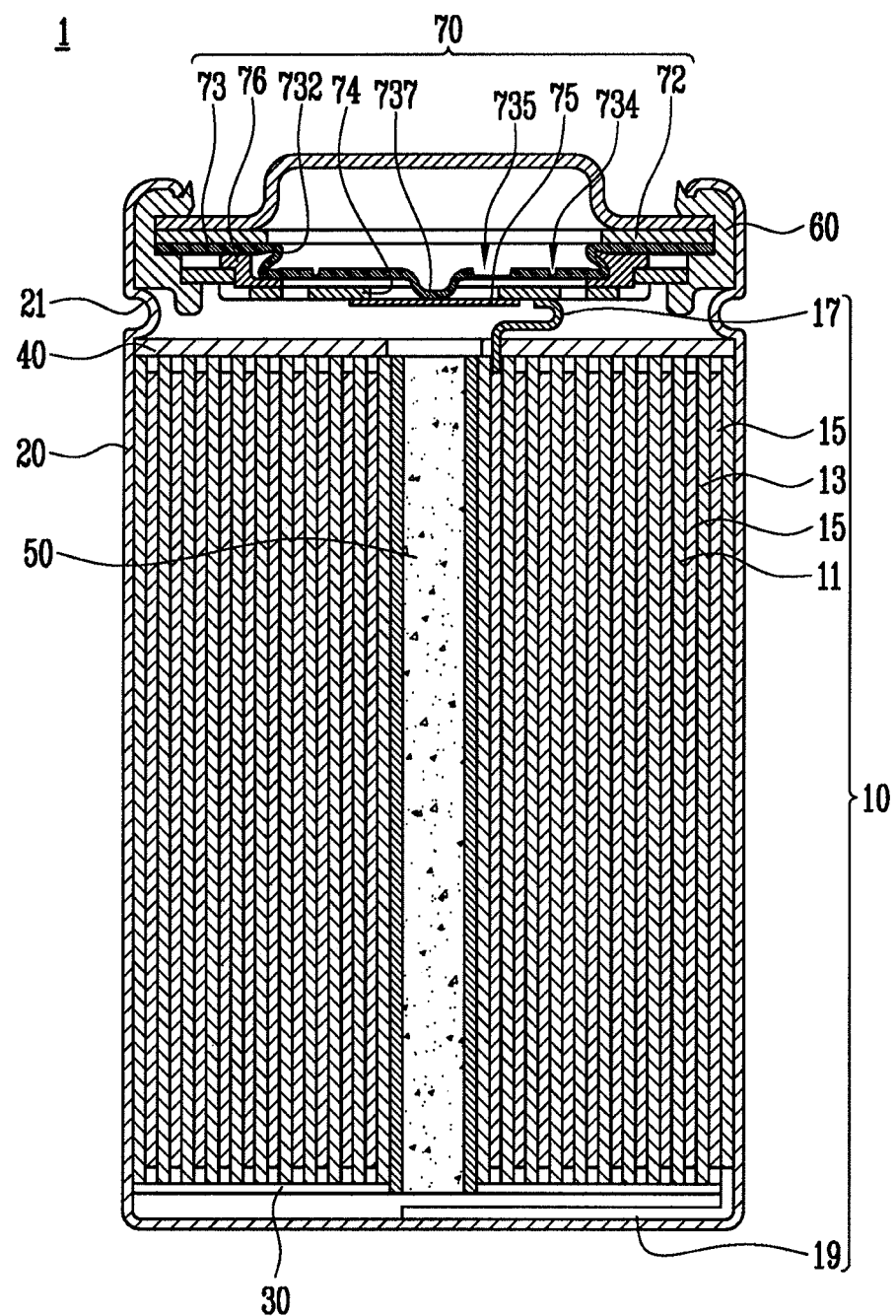
FIG. 1B is an assembled sectional view of the secondary battery shown in FIG. 1A.

FIG. 1A is an exploded perspective view of a secondary battery according to some embodiments. FIG. 1B is an assembled sectional view of the secondary battery shown in FIG. 1A.

Referring to FIGS. 1A and 1B, the secondary battery 1 includes an electrode assembly 10, a can 20 accommodating the electrode assembly 10 therein, and a cap assembly 70 sealing the can 20.

The secondary battery 1 may further include a lower insulation plate 30, an upper insulation plate 40, a center pin 50 and an insulation gasket 60.

The electrode assembly 10 may be formed in the shape of a jelly-roll by stacking and winding first and second electrode plates 11 and 13 formed in the shape of a rectangular plate.

In some embodiments, the electrode assembly 10 has a cylindrical shape, and the center of the electrode assembly 10 forms a hollow void.

The first and second electrode plates 11 and 13 have polarities different from each other, and a separator 15 is interposed between the plates 11 and 13 so as to prevent a short circuit between the two electrode plates 11 and 13.

The first or second electrode plate 11 or 13 may be formed by coating positive or negative electrode active material slurry on a collector made of aluminum or copper.

The first or second electrode plate 11 or 13 includes a non-coating portion on which the slurry is not coated, and first and second electrode tabs 17 and 19 are respectively attached to the non-coating portions so that current can be applied to the first and second electrode tabs 17 and 19. That is, the first electrode tab 17 is attached to the non-coating portion formed on the first electrode plate 11, and the second electrode tab 19 is attached to the non-coating portion formed on the second electrode plate 13. Thus, the first and second electrode tabs 17 and 19 have the polarities of the first and second electrode plates 11 and 13, respectively.

The first electrode tab 17 may be an upward electrode tab extending from the upper surface of the electrode assembly 10, which is an opening of the can 20, and the second electrode tab 19 may be a downward electrode tab extending from the lower surface of the electrode assembly 10.

In another embodiment, the first electrode tab 17 may extend to the lower surface of the electrode assembly 10, and the second electrode tab 19 may extend to the upper surface of the electrode assembly 10. The two electrode tabs 17 and 19 may extend in the same direction according to the battery forming process.

The can 20 may be formed of metal such as aluminum or stainless steel. The can 20 may have various shapes including a cylindrical shape and the like. The can 20 includes an opening into which the electrode assembly 10 is inserted.

The electrode assembly 10 is inserted inside the can 20 through the opening, and the lower insulation plate 30 may be positioned on the lower surface of the electrode assembly 10.

Before the electrode assembly 10 is inserted into the can 20, the second electrode tab 19 is bent to be substantially parallel with the bottom surface toward the central portion of the electrode assembly 10. A portion of the bent second electrode tab 19 is formed to cross the hollow void.

In one embodiment, where the lower insulation plate 30 is provided, the lower insulation plate 30 includes a through-hole formed to correspond to the hollow void of the electrode assembly 10. In this embodiment, the portion of the bent second electrode tab 19 also crosses the through-hole of the lower insulation plate 30.

The lower insulation plate 30 includes a plurality of holes 31, so at to minimize the reduction of an electrolyte injected due to a space decreased by the lower insulation plate 30.

According to the configuration described above, a welding rod is inserted into the electrode assembly 10 through the hollow void of the electrode assembly 10 and the through-hole of the lower insulation plate 30, and the second electrode tab 19 is welded to the bottom surface of the can 20. Thus, the can 20 has the same polarity as the second electrode tab 19, and the can 20 itself acts as an electrode terminal.

The upper insulation plate 40 may be positioned at an upper portion of the electrode assembly 10 inserted into the can 20. The center pin 50 may be inserted into the hollow void formed at the central portion of the electrode assembly 10.

The upper insulation plate 40 may include a plurality of first holes 41 formed so that the electrolyte can be well impregnated into the electrode assembly 10. The upper insulation plate 40 may include a second hole 43 formed to allow the first electrode tab 17 to be extracted to the outside therethrough.

The center pin 50 prevents the electrode assembly 10 from being deformed by an external force. For example, where the central portion of the center pin 50 is empty, the center pin 50 becomes a flow path of the gas generated from the electrode assembly 10.

The center pin 50 facilitates the impregnation of the electrolyte, and may include a plurality of holes 51 formed in the side surface thereof so that the gas generated from the electrode assembly 20 can be smoothly exhausted to the environment.

The can 20 includes a bead 21 formed by bending a side surface of the can 20 toward the inside of the can 20 to conform to the top level of the upper insulation plate 40. The bead 21 may prevent the electrode assembly 20 inserted inside the can 20 from substantially vertically moving.

The insulation gasket 60 is inserted into the opening of the can 20, and the cap assembly 70 is coupled in the insulation gasket 60 so as to seal the can 20. The insulation gasket 60 is made of an insulative material having elasticity. The insulation gasket 60 is formed to surround the outer surface of the cap assembly 70. The insulation gasket 60 seals the can 20 while allowing the can 20 and the cap assembly 70 having different polarities to be insulated from each other.

The cap assembly 70 includes a cap-up 71 serving as an electrode terminal, and lower components positioned beneath the cap-up 71.

In the cap assembly 70, the components may be installed in the insulation gasket 60 at a time in a state in which the components are coupled together, or may be sequentially stacked in the insulation gasket 60.

The lower components include a positive temperature coefficient (PTC) thermistor 72, a vent 73, a cap-down 74 and a sub-plate 75, which are sequentially positioned beneath the cap-up 71.

Specifically, the vent 73 is positioned beneath the PTC thermistor 72, and the cap-down 74 having a hollow void is positioned beneath the vent 73 with an insulation material 76 interposed therebetween. The vent 73 and the cap-down 74 are insulated from each other by the insulation material 76.

The cap-down 74 has a through-hole providing a passage so that when the internal pressure of the battery increases, the pressure can be applied to the lower surface of the vent 73. The sub-plate 75 is positioned beneath the cap-down 74 so as to cross the hollow void formed in the cap-down 74.

The sub-plate 75 is connected to a protruding portion 737 of the vent 73, exposed through the hollow void of the cap-down 74 through welding or the like.

Thus, the protruding portion 737 has a shape convexly protruded downward from the cap assembly 70, i.e., the direction of the electrode assembly 10 accommodated in the can 20.

The first electrode tab 17 extending upward from the electrode assembly 10 is connected to the lower surface of the cap-down 74 or the lower surface of the sub-plate 75 through welding or the like.

The cap-down 74 and the sub-plate 75 may be connected to each other through laser welding or the like. The protruding portion 737 of the vent 73 and the sub-plate 75 may be connected to each other through ultrasonic welding or the like.

The secondary battery according to one embodiment includes at least two fracture portions (or fracture regions) having different fracture pressures, which are formed in the vent 73.

The fracture portions are formed to be fractured when the internal pressure increases. The fracture portions may include a substantially circular first fracture portion 734 formed along the circumference of the protruding portion 737, and a second fracture portion 735 formed on a partial region inside the first fracture portion 734.

In one embodiment, when the internal pressure of the secondary battery increases, the second fracture portion 735 is first fractured to exhaust a portion of the gas. In some embodiments, when the internal pressure of the secondary battery continuously increases, the first fracture portion 736 is fractured to exhaust the gas.

In a secondary battery having only one fracture portion, when the internal pressure of the secondary battery rapidly increases due to heat directly exposed to the secondary battery, the gas rapidly generated inside the secondary battery cannot be quickly exhausted even though the fracture portion is fractured. Therefore, the secondary battery may explode. However, in some embodiments, the second fracture portion 735 that is an auxiliary fracture portion is further formed in the vent 73, as well as the first fracture portion 734 that is a main fracture portion, so that the rapidly increased gas can be effectively exhausted, thereby improving the safety of the secondary battery.

Figure 2A:
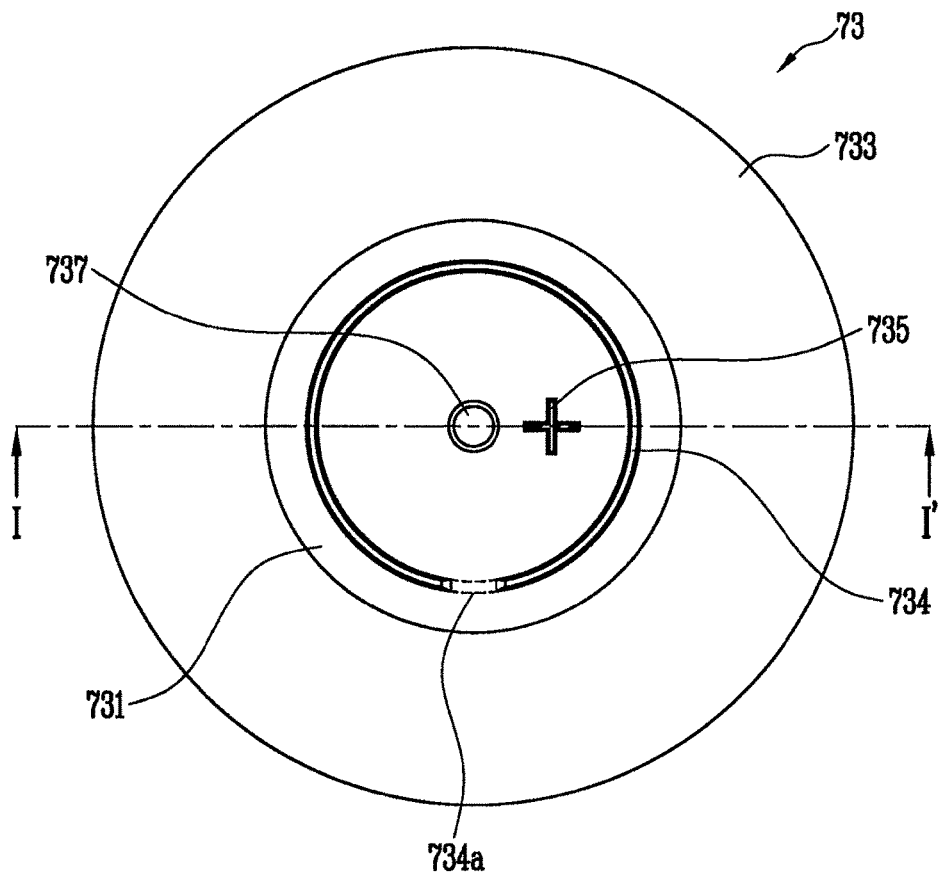
FIG. 2A is a plan view showing the shape of a vent according to an embodiment.
Figure 2B:
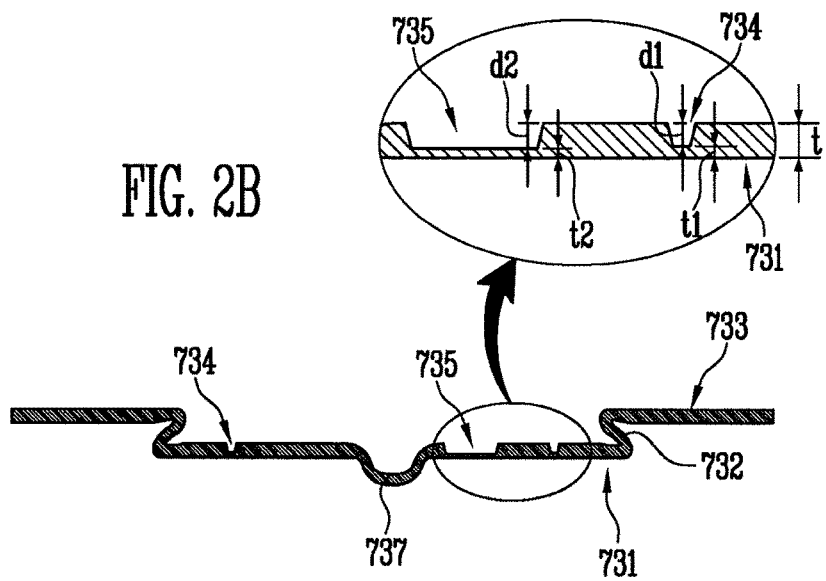
FIG. 2B is a sectional view taken along line I-I' of FIG. 2A.

FIG. 2A is a plan view showing the shape of a vent according to an embodiment. FIG. 2B is a sectional view taken along line I-I' of FIG. 2A.

Referring to FIGS. 2A and 2B, the vent 73 includes a body portion 731, a flange portion 733, a connection portion 732 connecting the body portion 731 and the flange portion 733 to each other, and a protruding portion 737.

The body portion 731 includes a substantially circular first fracture portion 734 formed along the circumference of the protruding portion 737, and a second fracture portion 735 formed on a partial region between the first fracture portion 734 and the protruding portion 737.

Gas may be generated inside the secondary battery due to internal and external factors such as overcharging, heat exposure of the secondary battery, and the like. The internal pressure in the secondary battery increases as the gas is generated.

In this case, the protruding portion 737, which is formed to protrude at the central lower portion of the vent 73 and electrically connected to the upper surface of the sub-plate 75 through welding, is moved upward by the increased pressure. Accordingly, the portion at which the protruding portion 737 and the sub-plate 75 are welded to each other comes off, or a certain region of the sub-plate 75 is cut in two or more electrically connected sections. As a result, the electrical flow of the secondary battery is cut off.

In some embodiments, the internal pressure of the secondary battery when the electrical flow of the secondary battery is cut off as describe above is referred to as an operational pressure for cutting off current.

Since the electrical flow is cut off as described above, the charging of the secondary battery is stopped. However, the gas is continuously generated due to the internal and external factors, and therefore, the internal pressure of the secondary battery may increase. Alternatively, the pressure of the secondary battery may continuously increase due to the external factor caused by heat exposure of the secondary battery.

That is, as the internal pressure of the secondary battery continuously increases, the secondary battery may explode. In order to prevent the explosion of the secondary battery, the fracture portions 734 and 735 allow the vent 73 to be fractured, so that the gas is exhausted to the environment, thereby decreasing the internal pressure.

In some embodiments, the internal pressure of the secondary battery when the vent 73 is fractured by the fracture portion is referred to as a fracture pressure.

The first fracture portion 734 may be fractured when the internal pressure of the secondary battery exceeds a first fracture pressure, and the second fracture portion 735 may be fractured when the internal pressure of the secondary battery exceeds a second fracture pressure. In this case, the first fracture pressure may be greater than the second fracture pressure.

The first fracture pressure may be about 19 kgf/cm$^2$ to about 21 kgf/cm$^2$ and the second fracture pressure may be about 14 kgf/cm$^2$ to about 16 kgf/cm$^2$.

For example, when the operational pressure is about 8 kgf, the second fracture pressure is about 15 kgf, and the first fracture pressure is about 20 kgf, the electrical flow is cut off by upward movement of the protruding portion 737 when the internal pressure of the secondary battery exceeds about 8 kgf, and the second fracture portion 735 is fractured when the internal pressure of the secondary battery exceeds about 15 kgf. Subsequently, the first fracture portion 734 may be fractured when the internal pressure of the secondary battery exceeds about 20 kgf.

In one embodiment, where the internal pressure of the secondary battery rapidly increases due to the heat exposed to the secondary battery, a plurality of fracture portions having different fracture pressures are formed in the vent 73 in order to prevent the risk of explosion of the secondary battery. Thus, in the secondary battery according to one embodiment, when the internal pressure of the secondary battery exceeds the second fracture pressure, the second fracture portion 735 is fractured so that the rapidly increasing internal pressure is lowered. Subsequently, when the internal pressure of the secondary battery exceeds the first fracture pressure, the first fracture portion 734 is fractured, so as to prevent the explosion of the secondary battery.

The first fracture portion 734 may be formed to be notched along the circumference of the protruding portion 737. In one embodiment, when the internal pressure of the secondary battery exceeds the first fracture pressure, the portion of the first fracture portion 734 notched along the circumference of the protruding portion 737 is fractured so that the gas is exhausted.

In this case, the first fracture portion 734 may include a disconnection region 734a on which a certain region is not notched. In a case where the disconnection region 734a is not formed, the entire first fracture portion 734 may be fractured, so that a portion of the vent 73 including a protruding portion formed in the first fracture portion 734 may collide with the cap-up or move inside the secondary battery, which may allow the cut-off flow of current to resume. Thus, in this embodiment, the disconnection region 734a prevents the partial region of the vent 73 in the first fracture portion 734 from being separated from the vent 73.

The second fracture portion 735 may be formed to be notched in a cross (+) shape on a partial region between the first fracture portion 734 and the protruding portion 737.

Unlike the first fracture portion 734 notched along the circumference of the protruding portion 737, the second fracture portion 735 is formed to be notched in the cross shape on the partial region. Thus, although the second fracture portion 735 is fractured, external air does not flow in the secondary battery through the second fracture portion 735, and the internal gas can be slowly exhausted through the second fracture portion 735.

However, since the first fracture portion 734 is fractured along the circumference of the protruding portion 737, the internal gas is further exhausted through the first fracture portion 734 as compared with a case where the second fracture portion 735 is fractured, and the external air may flow into the secondary battery through the fractured portion of the first fracture portion 734.

According to one embodiment, the thickness t1 of the first fracture portion 734 corresponds to the value obtained by subtracting the depth d1 of the first fracture portion 734 from the thickness t of the body portion 731, and the thickness t2 of the second fracture portion 735 corresponds to the value obtained by subtracting the depth d2 of the second fracture portion 735 from the thickness t of the body portion 731.

In one embodiment, since the first fracture pressure with which the first fracture portion 734 is fractured is greater than the second fracture pressure with which the second fracture portion 735 is fractured, the thickness t1 of the first fracture portion 734 is formed greater than the thickness t2 of the second fracture portion 735.

The thickness t of the body portion 731 may be in the range of about 0.29 mm to about 0.31 mm. The thickness t1 of the first fracture portion 734 may be in the range of about 0.09 mm to about 0.11 mm, and the thickness t2 of the second fracture portion 735 may be in the range of about 0.07 mm to about 0.89 mm.

The thickness t of the body portion 731 may be about 0.3 mm, the thickness t1 of the first fracture portion 734 may be about 0.10 mm, and the thickness t2 of the second fracture portion 735 may be about 0.08 mm.

Figure 3:
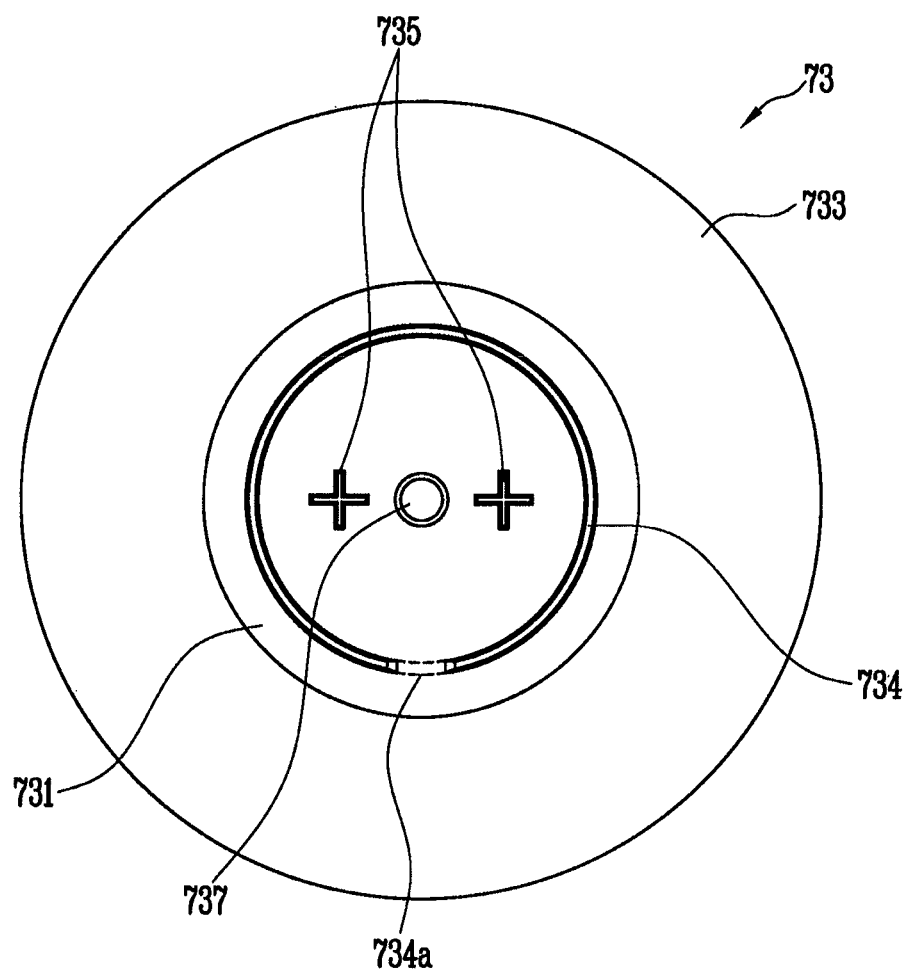
FIG. 3 is a plan view showing the shape of a vent according to another embodiment.

FIG. 3 is a plan view showing the shape of a vent according to another embodiment.

The second fracture portion 735 may be formed in plural numbers as shown in FIG. 3. In one embodiment, it is possible to primarily control the amount of gas exhausted by the second fracture portions 735 by adjusting the number of second fracture portions 735 formed in the vent 73.

Figure 4A:
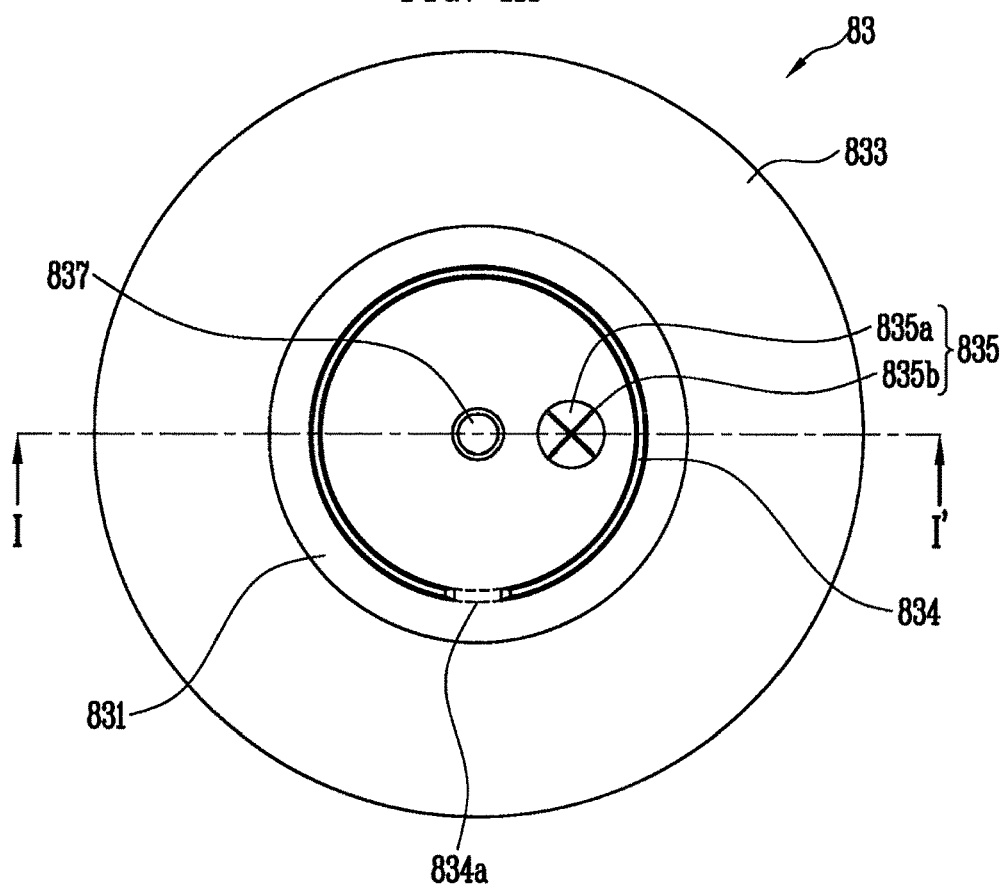
FIG. 4A is a plan view showing the shape of a vent according to still another embodiment.
Figure 4B:
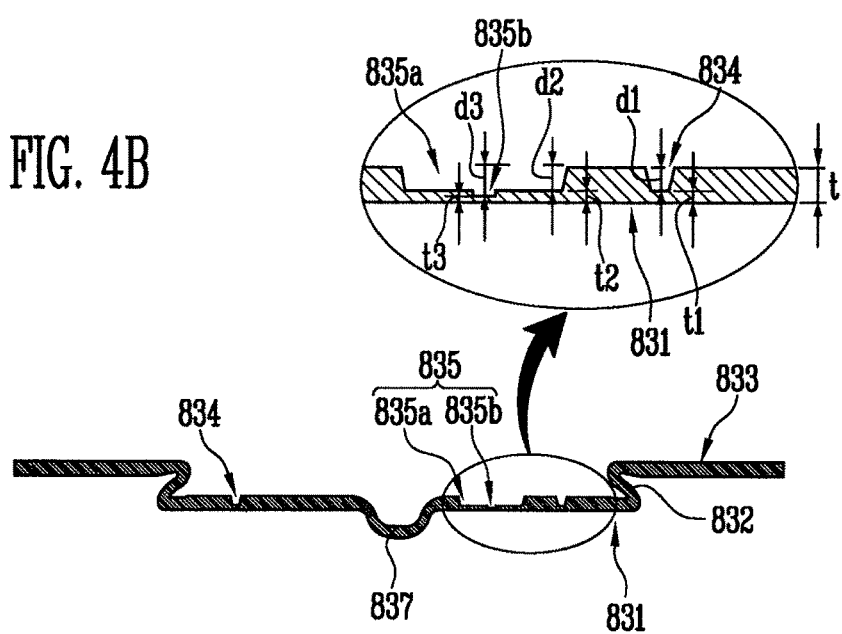
FIG. 4B is a sectional view taken along line I-I' of FIG. 4A.

FIG. 4A is a plan view showing the shape of a vent according to still another embodiment. FIG. 4B is a sectional view taken along line I-I' of FIG. 4A.

The shape of the vent shown in FIGS. 4A and 4B may be substantially identical to that of the vent shown in FIG. 2A, except that described below.

Referring to FIGS. 4A and 4B, the vent 83 according to this embodiment includes a body portion 831, a flange portion 833, a connection portion 832 connecting the body portion 831 and the flange portion 833 to each other, and a protruding portion 837. First and second fracture portions 834 and 835 are formed in the body portion 831.

In this case, the second fracture portion 835 includes a fracture region 835a having a thickness substantially identical to that t1 of the first fracture portion 834 or smaller than that t2 of the first fracture portion 834. At least one fracture line 835b may be formed at a portion of the fracture region 835a.

In a case where a plurality of fracture lines are formed on the fracture region, the fracture lines may be formed to cross each other.

Although the fracture region 835a is formed in a substantially circular shape in FIG. 4A, the present invention is not limited thereto. For example, the fracture region 835a may have various shapes such as a quadrangular shape. The fracture region 835a may be formed by compressing a partial region of the body portion 831.

In one embodiment, as the fracture line 835b is formed on the fracture region 835a, the thickness t3 of the fracture line 835b is smaller than that t2 of the fracture region 835a, and accordingly, the fracture of the second fracture portion 835 can be easily performed.

According to at least one of the disclosed embodiments, it is possible to provide a secondary battery capable of improving safety by quickly exhausting gas generated inside the battery to the environment. Furthermore, it is possible to provide a secondary battery having an additional gas vent.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
an electrode assembly;
a can accommodating the electrode assembly therein; and
a cap assembly sealing the can,
wherein the cap assembly comprises a sub-plate electrically connected to the electrode assembly and a vent having a protruding portion formed on the center thereof and electrically connected to the sub-plate, and
wherein the vent comprises i) a first fracture portion, ii) a second fracture portion formed between the first fracture portion and the protruding portion and iii) a non-fracture portion formed between and being thicker than the first and second fracture portions, wherein the first and second fracture portions have different thicknesses,
wherein the first fracture portion is configured to be fractured when an internal pressure of the secondary battery becomes greater than a first fracture pressure, wherein the second fracture portion is configured to be fractured when the internal pressure becomes greater than a second fracture pressure different from the first fracture pressure,
wherein the second fracture portion is closer to the center of the vent than the first fracture portion, wherein the first and second fracture portions have different widths and are neither directly connected to nor cross each other, wherein the second fracture portion is spaced apart from the protruding portion,
wherein the second fracture portion has inner and outer ends opposing each other, wherein the outer end is closer to the first fracture portion than the inner end, and wherein the outer end of the second fracture portion is located within a perimeter of the first fracture portion.

2. The secondary battery of claim 1, wherein the cap assembly further comprises a cap-up and a cap-down, and wherein the vent is positioned between the cap-up and the cap-down.

3. The secondary battery of claim 1, wherein the vent comprises:
a body portion on which the protruding portion and the first and second fracture portions are formed;
a flange portion extending from the body portion; and
a connection portion formed between the flange portion and the body portion.

4. The secondary battery of claim 1, wherein the thickness of the body portion is in the range of about 0.29 mm to about 0.31 mm, and wherein the thicknesses of the first and second fracture portions are in the ranges of about 0.09 mm to about 0.11 mm and about 0.07 mm to about 0.089 mm, respectively.

5. The secondary battery of claim 1, wherein the first fracture pressure is in the range of about 19 $kgf/cm^2$ to about 21 $kgf/cm^2$, and wherein the second fracture pressure is in the range of about 14 $kgf/cm^2$ to about 16 $kgf/cm^2$.

6. The secondary battery of claim 1, wherein the first fracture portion is different in size and shape from the second fracture portion.

7. The secondary battery of claim 1, wherein the first fracture portion has a circular shape.

8. The secondary battery of claim 1, wherein the cap assembly further comprises a cap-up and a cap-down, wherein the vent is positioned between the cap-up and the cap-down, wherein the cap-down is closer to the electrode assembly than the cap-up, wherein the cap-down has at least one passage configured to release at least some of the internal pressure toward the vent, wherein the second fracture portion overlaps the passage in the height dimension of the secondary battery, and wherein the first fracture portion does not overlap the passage in the height dimension of the secondary battery.

9. The secondary battery of claim 1, wherein no region of the second fracture portion is formed between adjacent regions of the first fracture portion.

10. The secondary battery of claim 1, wherein the entirety of the second fracture portion is fully surrounded by the perimeter of the first fracture portion.

11. The secondary battery of claim 1, wherein the second fracture portion is wider and thinner than the first fracture portion.

12. The secondary battery of claim 1, wherein the second fracture portion is positioned between a center of the vent and the first fracture portion and wherein the second fracture portion does not surround the center of the vent.

13. The secondary battery of claim 1, wherein the first fracture pressure is greater than the second fracture pressure.

14. The secondary battery of claim 13, wherein the second fracture portion is thinner than the first fracture portion.

15. The secondary battery of claim 1, wherein the first fracture portion is notched in a substantially circular shape along the circumference of the protruding portion.

16. The secondary battery of claim 15, wherein the first fracture portion includes a disconnection region on which a certain region is not notched, and wherein the second fracture portion is not formed in the disconnection region.

17. The secondary battery of claim 1, wherein the second fracture portion is notched in a cross (+) shape.

18. The secondary battery of claim 17, wherein the cross-shaped notch has a horizontal portion and a vertical portion that crosses and is in direct physical contact with the horizontal portion.

19. The secondary battery of claim 1, wherein the second fracture portion includes a fracture region having a thickness substantially identical to that of the first fracture portion or smaller than that of the first fracture portion, and wherein a fracture line is formed at a portion of the fracture region.

20. The secondary battery of claim 19, wherein the fracture line is formed in plural numbers, and wherein the fracture lines cross each other.

21. The secondary battery of claim 19, wherein the fracture region has a substantially circular shape or a substantially quadrangular shape.

22. A secondary battery, comprising:
an electrode assembly;
a can accommodating the electrode assembly therein; and
a cap assembly closing the can,
wherein the cap assembly comprises a gas vent, and wherein the gas vent comprises at least first and second fracture regions configured to be fractured by a fracture pressure applied thereto and a non-fracture portion formed between and being thicker than the first and second fracture regions,
wherein the first and second fracture regions are configured to be fractured by different fracture pressures,
wherein the gas vent has a protruding portion formed on the center thereof, wherein the first fracture region is closer to the center of the gas vent than the second fracture region, wherein the first and second fracture regions have different widths and are neither directly connected to nor cross each other, wherein the second fracture region is spaced apart from the protruding portion,
wherein the second fracture region has inner and outer ends opposing each other, wherein the outer end is closer to the first fracture region than the inner end, and wherein the outer end of the second fracture region is located within a perimeter of the first fracture region.

23. The secondary battery of claim 22, wherein the fracture regions comprise a first fracture region notched in a substantially circular shape and a second fracture region notched in a cross (+) shape.

24. A secondary battery, comprising:
an electrode assembly;
a can accommodating the electrode assembly therein; and
a cap assembly closing the can,
wherein the cap assembly comprises i) a first fracture region configured to be fractured when an internal pressure of the secondary battery becomes greater than a first fracture pressure, ii) a second fracture region configured to be fractured when the internal pressure becomes greater than a second fracture pressure different from the first fracture pressure and iii) a non-fracture portion formed between and being thicker than the first and second fracture regions,
wherein the cap assembly further comprises a gas vent having a protruding portion formed on the center thereof, wherein the first fracture region is closer to the center of the gas vent than the second fracture region, wherein the first and second fracture regions have different widths and are neither directly connected to nor cross each other, wherein the second fracture region is spaced apart from the protruding portion,
wherein the second fracture region has inner and outer ends opposing each other, wherein the outer end is closer to the first fracture region than the inner end, and wherein the outer end of the second fracture region is located within a perimeter of the first fracture region.

\* \* \* \* \*